United States Patent
Hewitt

(10) Patent No.: US 7,016,061 B1
(45) Date of Patent: Mar. 21, 2006

(54) LOAD BALANCING FOR RASTER IMAGE PROCESSING ACROSS A PRINTING SYSTEM

(75) Inventor: James A. Hewitt, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1205 days.

(21) Appl. No.: 09/697,955

(22) Filed: Oct. 25, 2000

(51) Int. Cl.
G06F 15/00 (2006.01)

(52) U.S. Cl. ..................................... 358/1.15; 358/1.13

(58) Field of Classification Search .................. 358/1.1, 358/1.3, 1.4, 1.6, 1.13, 1.14, 1.15, 1.16, 1.17, 358/538, 468
See application file for complete search history.

(56) References Cited

U.S. PATENT DOCUMENTS

| | | | |
|---|---|---|---|
| 5,469,533 A | 11/1995 | Dennis | 358/1.15 |
| 6,535,293 B1 * | 3/2003 | Mitsuhashi | 358/1.13 |
| 6,750,980 B1 * | 6/2004 | Shimura et al. | 358/1.15 |

FOREIGN PATENT DOCUMENTS

| | | |
|---|---|---|
| JP | 9-218763 A | 8/1997 |
| JP | 11188930 A | 7/1999 |
| JP | 2000039979 | 2/2000 |
| JP | 2000099287 | 4/2000 |

OTHER PUBLICATIONS

UK Search Report.

* cited by examiner

Primary Examiner—Mark Wallerson
(74) Attorney, Agent, or Firm—Leslie G. Murray

(57) ABSTRACT

A method and apparatus which dynamically determines if the raster image processing (RIP) for a print job data file is more efficiently performed by the host computer or by the printer in a printing system. The entire printing process is monitored and, based on a model for estimating the time required for various component print processes, a determination is made where the raster processing of the print data for the next print job should be performed to balance the processing load across the printing system to best utilize the maximum printing speed of the printer print engine.

31 Claims, 4 Drawing Sheets

LOAD BALANCING FOR RASTER IMAGE PROCESSING ACROSS A PRINTING SYSTEM

FIELD OF THE INVENTION

The present invention relates generally to the processing and transfer of data, and, more particularly, to a method of balancing the data processing load between a hard copy output device such as a printer and a host computer in a printing system to achieve a maximum output within the capability of the print engine.

BACKGROUND OF THE INVENTION

In a printing system, such as those employing laser or inkjet printers, for example, the data representing an image that is to be printed must be converted to a raster format in order for the printer print engine to be able to deposit pixels, sometimes referred to as "pels", of toner or ink on a print media. Prior art printers include rendering systems that reside in a printer. For example, most printers include a formatter board which is a combination of hardware and firmware to accomplish this rendering task, commonly referred to as RIPping (i.e., Raster Image Processing). At a host computer, application software is used to create a digital image data file, referred to as a print job, and a print driver is used to convert the digital image to a page description language (PDL) file using well-known techniques in the art that is suitable to be transmitted to a buffer of a printer. Internally of the printer, a print data pipeline of the printer performs several operations upon the transferred print data as the print data enters the pipeline in preparation for printing. These operations include print data compression, print data decompression, color space conversion, halftoning and formatting. Typically, the various processing operations are performed by a processor under the control of printer firmware or software. The printer formatter receives the print as a PDL file and RIPs (i.e., converts) it to a format acceptable to the print engine. A corresponding electronic image is then formed on a photoconductor drum, in the case of a laser printer, which is subsequently developed and transferred to the print media to form a printed hard copy output. The formatter board is designed—with compromises dictated by user requirements and cost concerns—to convert most "typical" print jobs to the required format at a sufficient rate to allow the printer to run at its rated engine speed.

However, increasingly more and more complex graphics print jobs require longer times for the formatter board to process thus reducing the rate at which data is transferred to the print engine resulting in reduced operating speeds for the print engine and reduced production for the printer. This is particularly a problem in commercial printing or commercial printing environments where it is important for the print production operators (i.e., personnel) to run the printers at the maximum capacity for large volume print output. A common approach to address this RIP bottleneck is to perform the RIP task at the host computer. The host computer typically has much more processing power than the printer, or is more easily upgraded, and the RIP process can be performed in parallel with other printing tasks. In printing systems which provide a RIP capability at the host computer or at both the host computer and the printer, typically the decision where the RIP task is to be performed is made statically at the time of system design or installation.

On the other hand, a print system which offloads all the RIP responsibility to the host computer encounters other performance issues.

Primarily, the size of a RIPped data file can increase to many times the size of the original print job format, particularly in high resolution (1200 dpi and greater) and high quality color (e.g., 24-bit color) printing. The size of the RIPped data file for each page is also affected by the size of the print media used. While the RIPped data file can be compressed prior to being transmitted to the printer, the size of that data file can still be significant. This results in two problems: first, an increase in the transmission time over the communication link between the host computer and the printer; and second, an increase in the time required by the printer to decompress and process the large amount of data in the RIP file. While some printers provide a "video port" which accepts print data in hardware-ready bits ("HRB"), a format directly acceptable by the printer print engine, a printer which does not provide an HRB input path must accept a raster image (i.e., RIP file) which must then be reprocessed. Although the reprocessing of the RIP file by the printer does increase the time required for the overall printing process, typically it is quicker than processing PDL vector or text data directly.

Accordingly there is a need for a way to dynamically balance the responsibility RIPping and other processing of a print job data file between the host computer and the printer to efficiently utilize the capabilities of the printing system including the communication link to run the printer at the rated capacity of the print engine.

SUMMARY OF THE INVENTION

The present invention is preferably embodied in a method and apparatus which dynamically determines on a job-by-job, or, alternatively, a page-by-page, basis if the raster image processing (RIP) for a print job data file is more efficiently performed by the host computer or by the printer in a printing system to provide printed output at the maximum rated print engine capacity. The method according to the present invention monitors the entire printing process and, based on a model for estimating the time required for various component print processes, determines where the RIPping of the next print job data file should be performed to balance the processing load across the printing system to best utilize the maximum printing speed of the printer print engine.

The present invention is implemented in a printing system in which a computer-based host includes processing circuitry, memory, and a raster formatter configured to render print job data into rasterized image data in a hardware-ready format. A control module is configured to determine dynamically, based on one or more printing system and print job parameters, to determine whether or not to RIP the print job data at the host computer or at an imaging device. If the print job data is to be RIPped at the imaging device, the print job data is transmitted directly to the imaging device. If the print job data is to be RIPped at the host computer, the print job data is passed to the raster formatter for conversion to hardware-ready format prior to transmitting to the imaging device.

The printing system includes one or more imaging devices coupled to the host computer via a communication bus. The imaging device includes a print engine for providing a printed output in response to a print job. The imaging device further includes a print formatter operative to receive print job data from the host and being configured to render print job data into rasterized image data in a hardware-ready format output. The hardware ready print data is then passed to the print engine. The imaging device also includes a hardware-ready firmware module operative to receive hardware-ready image data representing a print job from the host computer and transmit output containing the image to the print engine.

Other embodiments and advantages of the present invention will be readily appreciated as the same become better understood by reference to the following detailed description, taken in conjunction with the accompanying drawings. The claims alone, not the preceding summary or the following detailed description, define the invention.

DESCRIPTION OF THE DRAWINGS

The accompanying drawings are included to provide a further understanding of the present invention and are incorporated in and constitute a part of this specification. The drawings illustrate the embodiments of the present invention and together with the following detailed description illustrate by way of example the principles of the present invention. The components in the drawings are not necessarily to scale, emphasis instead being placed upon clearly illustrating the principles of the present invention. In the drawings like reference numbers indicate identical or functionally similar elements throughout the several views thereof, and wherein.

DETAILED DESCRIPTION OF THE INVENTION

Figure 1:
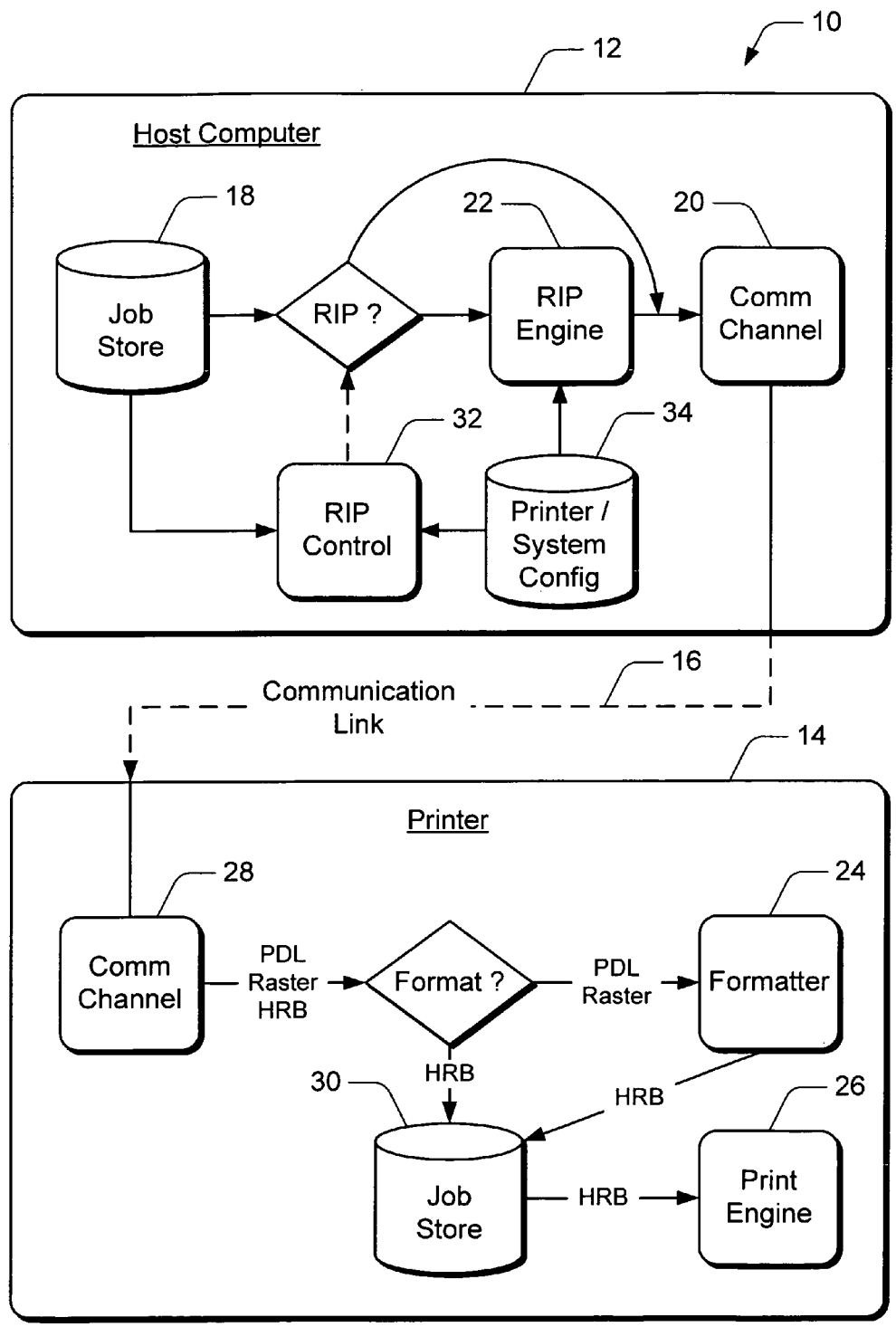
FIG. 1 is a conceptual schematic block diagram of a printing system according to the principles of the present invention.

As shown in the drawings for purposes of illustration, the present invention is preferably embodied in a method and apparatus which dynamically determines on a job-by-job, or, alternatively, a page-by-page, basis if the raster image processing (RIP) for a print job data file is more efficiently performed by the host computer or by the printer in a printing system to provide printed output at the maximum rated print engine capacity. The method according to the present invention monitors the entire printing process and, based on a model for estimating the time required for various component print processes, determines where the RIPping of the next print job data file should be performed to balance the processing load across the printing system to best utilize the maximum printing speed of the printer print engine. In a preferred embodiment, the method of the present invention directs the print job data processing (RIP) at either a host computer or an imaging device to ensure that print data in an HRB format is transmitted to the printer print engine at a sufficiently high rate to allow the print system to operate at the print engine maximum rated print speed.

In an effort to prevent obscuring the invention at hand, only details germane to implementing the invention will be described in great detail, with presently understood peripheral details being incorporated by reference as being presently understood in the art.

For purposes of this disclosure, the term "JetReady" refers to a hardware-ready bits ("HRB") architecture wherein a hardware path is provided directly into a hardware imaging pipeline for a hard copy output device. A JetReady mode provides such a hardware path and allows data to flow through the printer as quickly as possible from an external source, directly to hardware on the hard copy output device. According to one embodiment described below, the hard copy output device is a printer that implements a JetReady mode.

Also for purposes of this disclosure, the term "JetSend™" refers to a communications protocol for use over any bidirectional transport medium such as Transmission Control Protocol/Internet Protocol (TCP/IP), and including both wired and wireless transport medium. The JetSend communications protocol is provided by the Hewlett-Packard Company. Such solution is presently commercially available, and does not require the use of a driver or an intermediary, such as e-mail or a print server, in order to send information from one JetSend-enabled device to another JetSend device. For example, documents can be captured with one JetSend-enabled device, then sent to a second JetSend-enabled device, such as a printer.

Referring now to FIG. 1, a conceptual block diagram of a printing system 10 including a host computer 12 coupled to one or more imaging devices 14 via a communication link 16 according to an embodiment of the present invention is shown. For the purposes of this disclosure, the imaging device 14 is in the form of a laser printer 14 that employs an electrophotographic drum imaging system, as is known in the art. However, as will be obvious to those of ordinary skill in the art, the present invention is similarly applicable to other types of printers and/or imaging devices including, for example, inkjet printers, facsimile machines, copiers, or the like. The communications network 16 is in the form of a local area network (LAN). Host computer 12 and laser printer 14 can be connected together via JETADMIN™ LAN Ethernet connections available from the Hewlett-Packard Company. Corresponding hardware includes a JetDrive™ multiprotocol EIO card which is an Ethernet card that spools out print jobs from the network 16 and is available from the Hewlett-Packard Company. However, in other embodiments, the communications network 16 may be a wide area network (WAN) or the Internet, for example, or a host computer may be directly connected to a printing device.

As used herein, EIO refers to an enhanced input/output comprising a hardware interface for Hewlett-Packard printers which is used for adding an internal print server and network adaptor, a hard disk and other plug-in functionality. EIO cards are configured to use a PCI bus.

In the printing system 10 of the present invention, the host computer 12 includes a memory device 18 and a communications input/output (I/O) channel 20 coupling the host computer 12 to the communication link 16. Print jobs, originated in an application program resident on host computer 12 or externally, are stored in memory 18. Memory 18 may be any of well known memory devices such as a magnetic disk or solid state memory, for example. Host computer 12 also includes one or more printer drivers (not shown) for converting the print job data file to a page description language (PDL) file, and a formatter or RIP engine 22 including all the necessary hardware and firmware required to convert a print job PDL file to a hardware ready bits (HRB) file.

The imaging device or printer 14 includes a formatter 24, a print engine 26 and an communications I/O channel 28 coupling the printer 14 to the communication link 16. As in the host computer 12, the printer formatter 24 includes all the necessary hardware and firmware required to convert a print job PDL file to a HRB file. When the printer formatter 24 completes the formatting of a print job, the HRB file is sent to the print engine 26 to print the job, or, alternatively, the formatted print job is sent to memory device 30 to be stored until the print engine 26 is free to accept the print job. Memory device 30 may be any of well known memory devices such as a magnetic disk or solid state memory, for example. Memory 18 may be any of well known memory devices such as a magnetic disk or solid state memory, for example. Printer 14 also implements the capability to accept a print job in the form of a HRB file. The printer 14 includes the necessary HRB hardware, firmware and communications to send an HRB file directly to the print engine 26 without the need to be reprocessed by the formatter 24. As in the case of a print job file processed by the formatter 24, a print job HRB file may be stored in memory device 30 until the print engine is free to accept the print job. In another preferred embodiment, the imaging device formatter 24 of the present invention implements sufficient logic to receive and process a print job in HRB format and pass the HRB file to the print engine 26.

When it is desired to print one or more print jobs, the print job data file is transmitted to the printer 14 via the host I/O channel 20 and the communication link 16. According to the principles of the present invention, the host computer 12 includes a RIP control module 32 which monitors the printing system 10 configuration and the printing process conditions to determine the most efficient location, either the host computer 12 or the printer 14, to perform the RIPping process for a print job or each page or selected portion of a print job. In the event the RIP control module 32 determines that the print job should be processed at the host computer 12, the print job PDL file is passed to the RIP engine 22, processed and then transmitted directly to the print engine 26 via I/O communication channels 20, 28 and the communication link 16 as a HRB file.

The RIP control module 32 uses an algorithmic model to evaluate various factors defining potential performance and communication bottlenecks or congestion that will slow or retard the printing process. Related factors include, for example, speed of the printer formatter 24, speed of the print engine 26, complexity of the print job including complexity of individual pages of the print job, size of the print media, resolution, color depth (or bits per pixel for monochrome grayscale or side band cases), bandwidth of the communication link 16 (including the traffic load in a network), number of printers receiving the print job, compression level of pre-RIPped data, capabilities of the printer, copy count of the last print job, computing power of the host computer 12, print job file size (i.e., HRB versus raster image embedded in PDL), and, finally, operator or user preference (for example, there may be a quality difference between the RIP performed by the printer formatter 24 and the host RIP engine 22). In a preferred embodiment, the algorithmic model may implement heuristic techniques including collecting and maintaining historical data to refine some parameters used in the determination process. For example, use of historical data to determine the effects of compression and job complexity on the efficiency and speed of the print system 10.

The RIP control module 32 continuously monitors the condition of various components of the printing system 10 including, for example, I/O communication channels 20, 28, the communication link 16, the print engine 26, the host computer RIP engine 22 and the printer formatter 24. The RIP control module 32 also monitors the print system 10 parameters and configuration, the print system 10 parameters and configuration being stored in a configuration file in memory module 34, the configuration file being updated as the parameters and configuration change. The characteristics, parameters and complexity of the print job also are considered in the determination of where to process the print job. The memory module 34 may be a separate memory device such as a magnetic or solid state memory, for example, or, alternatively, may be included in memory device 18. In a preferred embodiment, the RIP control module 32 is a microprocessor which executes software implementing the RIP determination model.

Figure 2:
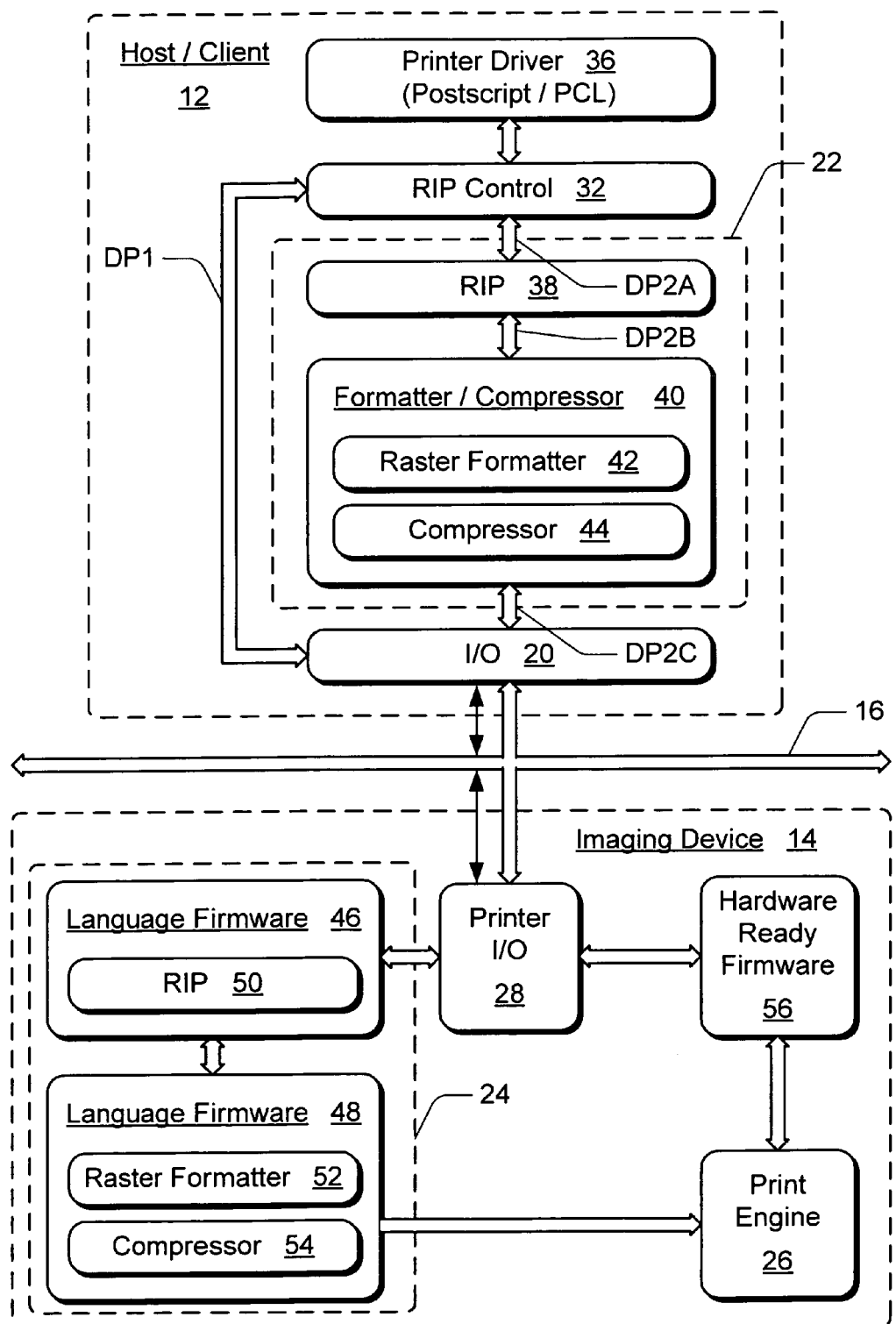
FIG. 2 is a block diagram of the printing system of FIG. 1.

Referring now also to FIG. 2, a block diagram of the printing system 10 is shown. Such printing system 10 includes client or host computer 12, one or more imaging devices 14 and communication link or bus 16. Communication bus 16 facilitates transfer of data between host computer 12 and one or more imaging devices 14 on the printing system 10. According to one embodiment, host computer 12 is a personal computer or workstation and imaging device 14 is a laser printer. According to other embodiments, host computer 12 can be any device in a local area network having processing capabilities that is capable of requesting information or applications from a file server or other external source. Similarly, according to another embodiment imaging device 14 can be a copier or a multiple function peripheral (MFP).

Host computer 12 includes a printer driver 36 which is a file used by a program to execute commands in order to operate the imaging device 14, or more particularly, printer 14. Printer driver 36 can be implemented with Postscript, PCL, or more generally, a page description language (PDL) to provide a base level image rendering process which embeds vector, raster, or text data, or a combination of two or more types of data, describing an image in a PDL file that, in the prior art, is transmitted to the imaging device 14 for formatting (RIP) by the printer formatter 24.

As discussed with reference to FIG. 1, host computer 12 includes RIP control module 32 which is a control unit that can be used to manage host computer 12 and one or more imaging devices 14 such that load balancing can be used to distribute print data processing (RIP) workload over printing system 10. Once the printer driver 36 has processed a print job, the resulting PDL file is passed to the RIP control module 32. The RIP control module 32 is coupled both directly to the host I/O communication channel 20 and to the host RIP engine 22. RIP engine 22 includes a raster image processor (RIP) 38 and a hardware-specific formatter/compressor apparatus 40. Formatter/compressor apparatus 40 includes a raster formatter 42 and a compressor 44.

In operation, raster image processor (RIP) 38 performs raster conversion on the page description language (PDL) data, such as Postscript or PCL, received from printer driver 36, via RIP control module 32, and generates a generic raster data format.

Also in operation, raster formatter 42 of formatter/compressor 40 converts generic raster data from RIP 38 into a compressed hardware-ready data format. RIP 38 cooperates with formatter/compressor 40 to provide hardware-ready firmware implemented by the RIP engine 22.

The imaging device 14 includes formatter 24 implementing printer language firmware 46 and internal formatter/compressor apparatus 48, and a hardware-ready firmware module 56. Printer language firmware 46 includes an internal raster image processor (RIP) 50. Formatter/compressor apparatus 48 includes an internal raster formatter 52 and an internal compressor 54.

Applicant's invention provides a traditional data path identified by "DP1" and an additional, alternate data path identified by "DP2". Data path DP1 transfers print data from host computer 12 to printer 14 via host computer I/O channel 20, essentially sending high-level printer language (PDL) from printer driver 36 to the printer formatter 24. Alternatively, data path DP2 transfers processed, i.e., RIPped, HRB print data directly to the hardware ready firmware 56 and the print engine 26. "DP2A–C" cooperate to provide a data path extending within host computer 12 for transferring print jobs to printer 14 from host computer 12. More particularly, printer driver 36 sends data in the form of a PDL file, such as PCL, to RIP 38 via data path "DP2A". Rip 38 sends generic raster data to formatter/compressor 40 via data path "DP2B". Finally, formatter/compressor 40 sends compressed hardware-ready format data to the host computer I/O communication channel 20 to be transmitted to hardware-ready firmware 56 at imaging device 14 via communication link 16.

Figure 3:
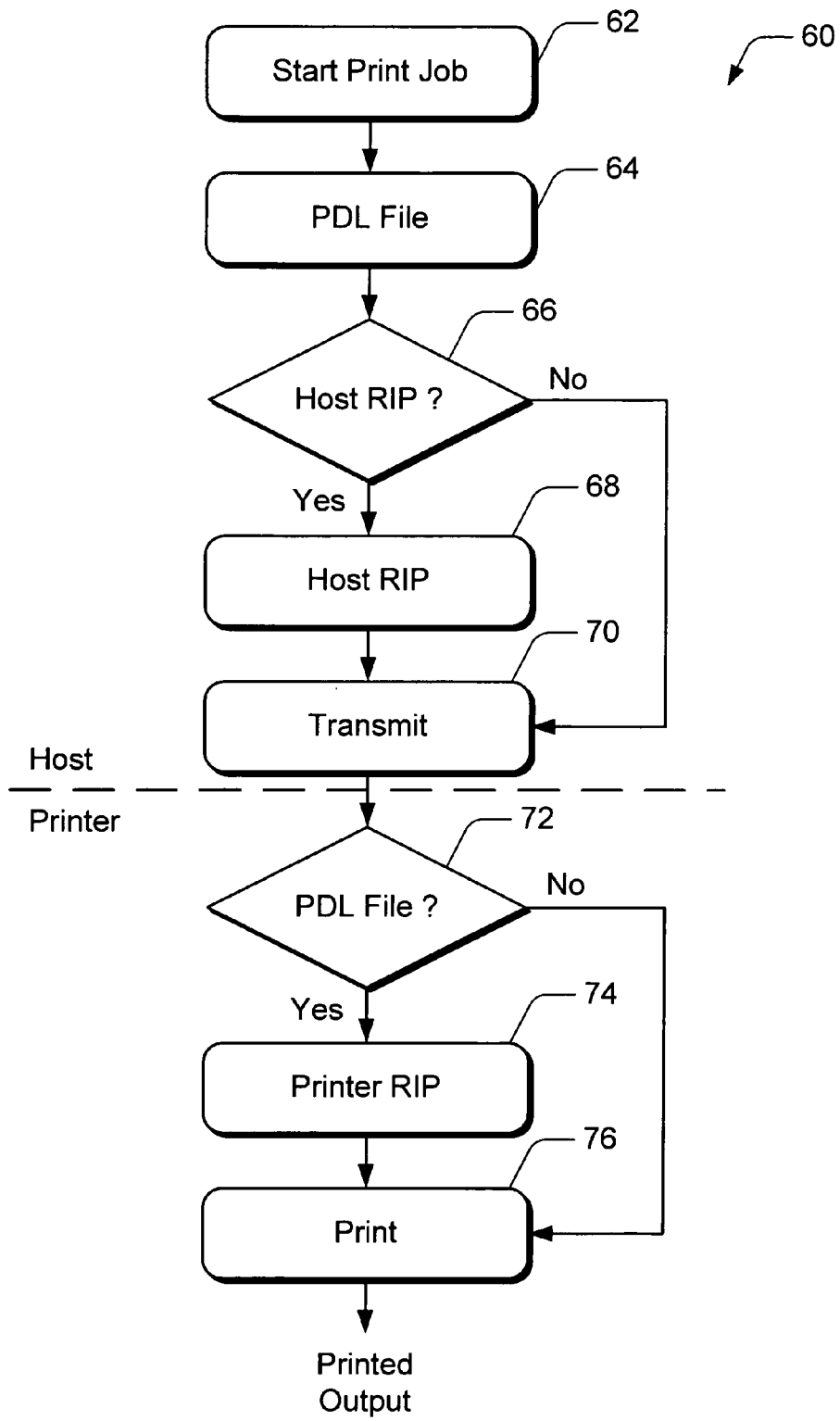
FIG. 3 is a process flow diagram of a preferred method for practicing the present invention.

Referring now also to FIG. 3, a flow chart depicting a method of balancing the print data processing load across the printing system according to the principles of the present invention is shown. More particularly, the process 60 determines where to perform the raster imaging process (RIP), at a host computer or at a printer, for a print job to allow a printing system to operate at the rated print speed for the printer print engine without significant interruptions or delays. Process 60 begins at step 62 when a user at a host computer 12 submits a print job such as a document drafted in a word processing application, for example. The print job data file is transferred to the printer driver 36 where it is converted, step 64, to a high level page description language (PDL). At step 66, the RIP control module 32, as described with reference to FIG. 1, determines whether or not the PDL file should be RIPped at the host computer 12 or at the imaging device 14. In the event the RIP control module 32 determines that the print job PDL file should be RIPped at the host, the PDL file is passed to the host computer RIP engine 22. At the RIP engine 22, the PDL file is converted, step 68, to a hardware ready bits (HRB) format. Then the HRB file is passed to the host I/O communication channel 20 to be transmitted, step 70, to the imaging device 14. In the event the RIP control module 32 determines that the print job should be RIPped at the imaging device 14, the print job PDL file is passed directly from the printer driver 36 to the host I/O communication channel 20 to be transmitted, step 70, to the imaging device 14.

At the imaging device 14, the format of the print job data is determined at step 72. In the event the print job transmitted from the host computer 12 is a PDL file, the print job is passed to the printer formatter 24 to be RIPped at step 74 converting the print job to an HRB format. The HRB file is then passed to the print engine 26 to be printed, step 76. In the event the print job is determined, step 72, to be a HRB file, it is passed directly via the hardware ready firmware 56 to the print engine 26 to be printed at step 76.

Figure 4:
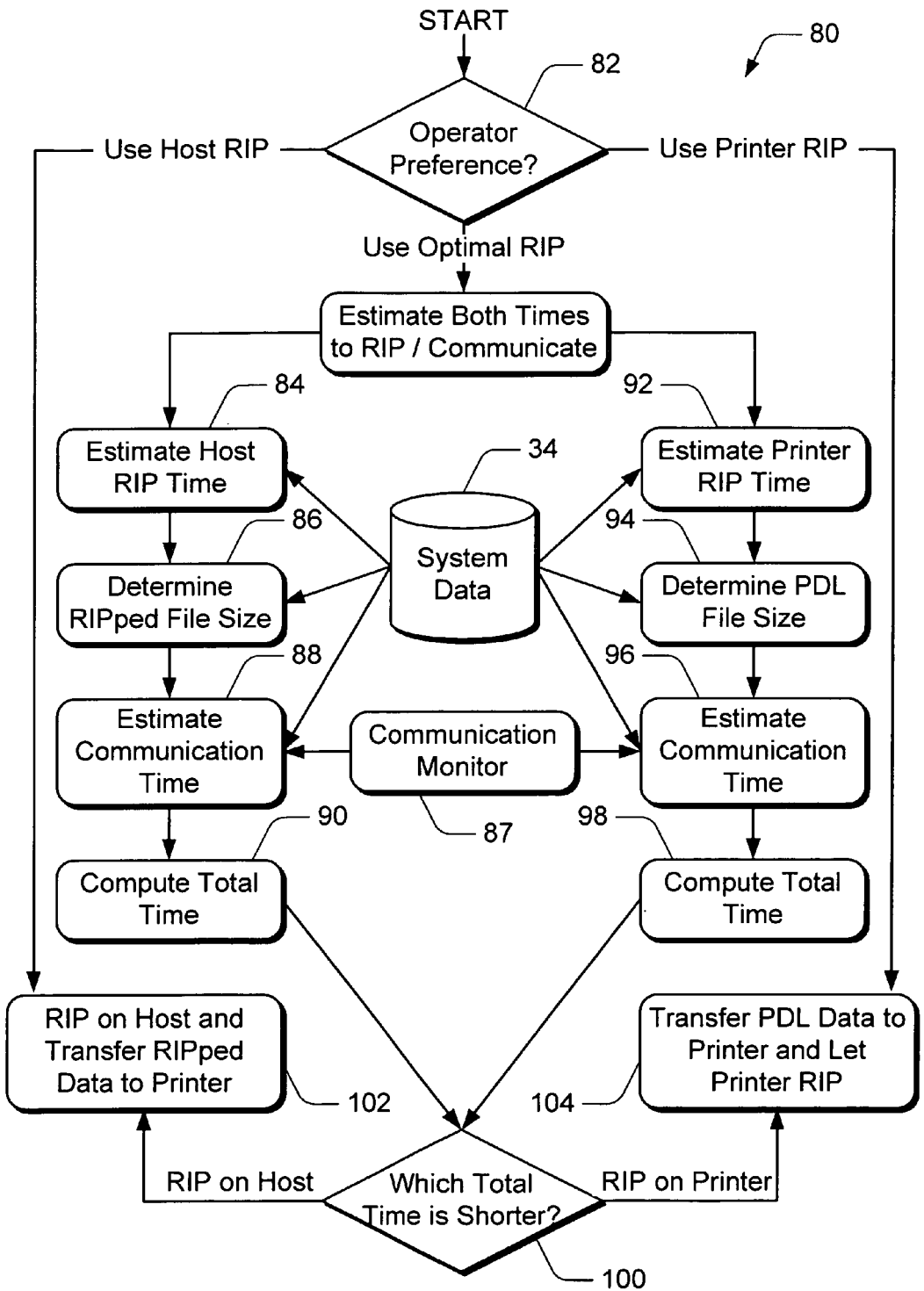
FIG. 4 is a flow diagram illustrating a preferred algorithm implementing the present invention.

Referring now also to FIG. 4, a flow diagram illustrating a preferred algorithm for determining whether the RIP task will be performed at the host computer 12 or the imaging device 14 is shown. As discussed above with reference to FIG. 1, in a preferred embodiment algorithmic model 80 is implemented by RIP control module 32 to evaluate various factors defining potential performance and communication bottlenecks or congestion that will slow or retard the printing process. More particularly, at step 66, of the method 60 as described with reference to FIG. 3, the RIP control module 32, determines whether or not the PDL file should be RIPped at the host computer 12 or at the imaging device 14. Starting at step 82, in a preferred embodiment, user or operator preference is first determined, i.e., whether the user has preselected the host computer 12 or the imaging device 14 to process (RIP) the print job data. In the event the user has not preselected the host computer 12 or the imaging device 14 to process the print job data, the task passes to the RIP control module 32 to determine where the print job data will be RIPped to provide optimal utilization of the print system allowing the print engine 26 to operate at its maximum rated print speed. In a preferred embodiment, the algorithm estimates, in parallel, the total amount of time required for the print job data to be RIPped and transmitted to the print engine 26 for both the host computer 12 and the imaging device 14. For example, at steps 84–90 the total time required to RIP the print job data and transmit it to the print engine 26 is estimated for the host computer 12; similarly, at steps 92–98 the total time required to RIP the print job data and transmit it to the print engine 26 is estimated for the imaging device 14. The algorithm then determines whether to use the host computer 12 or the imaging device 14 based on which data path provides the shortest time to transmit the RIPped print data to the print engine 26.

To estimate the total amount of time required for the host computer 12 to process the print job data and transmit it to the print engine 26, first the time required for the host RIP engine 22 to convert the print data to a HRB format is estimated at step 84. The amount of time required to process the print data at RIP engine 22 is a function of several variables, such as print job size and complexity, size of print media and the speed of the hardware, for example. Memory device 34 provides print system configuration and other static or predetermined data to the algorithm 80 required to estimate or calculate the various values for the algorithm steps. At step 86, the size of the RIPped print job file is determined. At step 88 the time required to actually transmit the processed print job data file across the communication link 16 is estimated. Several factors govern how fast the print data can be transmitted across the communication link, such as bandwidth, bus speed and present communications load, for example. Communication monitor 87 monitors the operating conditions of the print system communication links and bus, data paths DP1 and DP2 as well as communication link 16, for example. Communication monitor 87 provides workload data, such as how close to rated capacity a communication path or bus may be operating, for example. Using the information from steps 84, 86 and 88, the total time to RIP the print data at the host computer 12 and transmit the print data in HRB format to the print engine 26 is computed at step 90.

Similarly, the total amount of time required for the print job data to be transmitted to the imaging device 14, processed (RIPped) by the imaging device formatter 24 and the print data in a HRB format tranmitted to the print engine 26, is estimated at steps 92–98. At step 92, the amount of time required to RIP the print data at the imaging device formatter 24 is estimated. Typically, the host computer 12 will have greater processing power and the print data processing will be accomplished in a shorter time period at the host. However, as other factors, the print job size and complexity, for example, also affect the total time required to get the HRB print data to the print engine 26, the amount of time required to actually RIP the print data may not always be the deciding factor. The size of the print job PDL file transmitted to the imaging device 14 is determined at step 94. In a similar manner as described with reference to step 88, at step 96 the time required to actually transmit the print job PDL data file across data link DP1 and communication link 16, and the processed print data in HRB format from the formatter 24 to the print engine 26 is estimated. Then using the information from steps 92, 94 and 96, the total time to transmit the print data to the imaging device 14, RIP the print data at the imaging device formatter 24 and transmit the print data in HRB format to the print engine 26 is computed at step 98.

The two total times, the time for processing the print data at the host computer 12 and the time for processing the print data at the imaging device 14, are compared at step 100. The shorter of the two total time for processing and communicating the print data to the print engine determines which data processing path is used. At step 66 in process 60, then, the shorter total time determined at step 100 directs the print job data to the host computer 12, step 102, or to the imaging device, step 104, for processing and transmitting to the print engine 26.

In addition to the foregoing, the logic of the present invention can be implemented in hardware, software, firmware, or a combination thereof. In the preferred embodiment(s), the logic is implemented in software or firmware that is stored in a memory and that is executed by a suitable instruction execution system. If implemented in hardware, as in an alternative embodiment, the logic can be implemented with any or a combination of the following technologies, which are all well known in the art: a discrete logic circuit(s) having logic gates for implementing logic functions upon data signals, an application specific integrated circuit (ASIC) having appropriate logic gates, a programmable gate arrays(s) (PGA), a field programmable gate array (FPGA), etc.

Also, the flow charts and diagrams of FIGS. 1, 2, 3 and 4 show the architecture, functionality, and operation of a possible implementation of the logic. In this regard, each block represents a module, segment, or portion of code, which comprises one or more executable instructions for implementing the specified logical function(s). It should also be noted that in some alternative implementations, the functions noted in the blocks may occur out of the order noted in FIGS. 3 and 4. For example, two or more blocks shown in succession in FIGS. 3 and 4 may in fact be executed substantially concurrently or the blocks may sometimes be executed in the reverse order, depending upon the functionality involved.

Finally, the logic which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example, but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM)(magnetic), a read-only memory (ROM)(magnetic), an erasable programmable-read-only memory (EPROM or Flash memory), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

While having described and illustrated the principles of the present invention with reference to various preferred embodiments and alternatives, it will be apparent to those familiar with the art that the invention can be further modified in arrangement and detail without departing from those principles. Accordingly, it is understood that the present invention includes all such modifications that come within the terms of the following claims and equivalents thereof.

I claim:

1. A printing system in which print job data processing is balanced between a host and one or more imaging devices, comprising:

a computer-based host having a raster formatter configured to convert print data to rasterized image data in a hardware-ready format as hardware-ready image data, and a control module adapted to dynamically determine, based on at least one parameter, to transmit print data to an imaging device or to transmit the print data to the raster formatter for conversion to the hardware-ready format prior to transmitting the print data to the imaging device; and at least one imaging device communicating with the host and having a print engine, a formatter coupled to the print engine operative to receive print data from the host and configured to convert the print data into rasterized image data in a hardware-ready format, and hardware-ready firmware operative to receive the hardware-ready image data from the computer-based host and transmit output containing the image directly to the print engine.

2. The printing system of claim 1 wherein the computer-based host includes a memory module for storing a print system configuration file, the memory module being coupled to the control module.

3. The printing system of claim 1 further comprising a system monitoring module for monitoring operating conditions of the print system components, the monitoring module being coupled to the control module.

4. The printing system of claim 3 wherein the system monitoring module monitors the operating conditions of the print system communication links and buses.

5. The printing system of claim 1 wherein the computer-based host raster formatter includes a data compression module.

6. The printing system of claim 1 further comprising a printer driver for converting a print job print data to a page description language file representing the print job data.

7. The printing system of claim 1 wherein the imaging device comprises a laser printer.

8. The printing system of claim 1 wherein the control module comprises a microprocessor adapted to execute a software program for dynamically determining to transmit print data to an imaging device for conversion to the hardware-ready format or to transmit the print data to the raster formatter for conversion to the hardware-ready format prior to transmitting the print data to the imaging device.

9. A method for balancing print data processing between a host computer and one or more imaging devices in a printing system, the host computer and an imaging device being adapted to convert print data to a hardware ready format for printing, comprising:
   dynamically determining, based on at least one parameter, to convert the print data at the host computer or at the imaging device;
   in an event the print data is to be converted at the imaging device:
      transmitting the print data to the imaging device;
      receiving the transmitted print data at the imaging device;
      converting the print data to a hardware ready format;
      transmitting the converted print data to a printing device; and
   in an event the print data is to be converted at the host computer:
      converting the print data to a hardware ready format as converted print data;
      transmitting the converted print data to the imaging device;
      receiving the converted print data at the imaging device; and
      transmitting the received converted print data directly to the printing device.

10. The method of claim 9 wherein converting the print data to a hardware ready format at the host computer includes:
   converting the print data to a raster data format; and
   converting the rasterized data to a hardware ready data format.

11. The method of claim 10 wherein converting the print data to a hardware ready format at the host computer further includes compressing the hardware ready data.

12. The method of claim 9 wherein transmitting the print data to the imaging device for conversion at the imaging device includes converting the print data to a page description language file prior to transmitting the print data to the imaging device.

13. The method of claim 9 wherein dynamically determining to convert the print data at the host computer or at the imaging device includes calculating the total amount of time required to transmit the print data to the printing device for each of the host computer and the imaging device to convert the print data to a hardware ready format.

14. The method of claim 13 wherein the determination to convert the print data to a hardware ready format at the host computer or at the imaging device is based on the shorter of the total amount of time required to transmit the print data to the printing device for each of the host computer and the imaging device to convert the print data to a hardware ready format.

15. The method of claim 9 wherein the imaging device comprises a laser printer.

16. The method of claim 9 wherein dynamically determining to convert the print data at the host computer or at the imaging device is performed by a control module.

17. The method of claim 16 wherein the control module comprises a microprocessor adapted to execute a software program for dynamically determining to transmit the print data to an imaging device for conversion to a hardware-ready format or to convert the print data to a hardware-ready format at the host computer prior to transmitting the print data to the imaging device.

18. An article of manufacture comprising a program storage medium having computer readable program code means embodied therein for adapting a computer to dynamically determine to convert print data representing a print job at a host computer or at an imaging device in a print system, the computer readable program code means in the article of manufacture including:
   computer readable program code means for enabling a computer to compute a first time period, the first time period being the total amount of time required for the host computer to convert the print data to a hardware ready format and to transmit the converted print data directly to a printing device in the imaging device;
   computer readable program code means for enabling the computer to compute a second time period, the second time period being the total amount of time required to transmit the print data to an imaging device, for the imaging device to convert the print data to the hardware ready format and to transmit the converted print data to the printing device; and
   computer readable program code means for enabling the computer to determine the shorter of the first and second time periods, and to transmit the print data to the host computer or to the imaging device for conversion to the hardware ready format based on the shorter of the first and second time periods.

19. A printing system, comprising:
   a controller configured to distribute print data processing of a print job between a computing device and an imaging device that is communicatively coupled to the computing device;
   a first print data processor in the imaging device configured to receive a first portion of the print data and generate image data for input to a print engine of the imaging device;
   a second print data processor in the computing device configured to receive a second portion of the print data and generate additional image data for input to the print engine of the imaging device; and
   hardware-ready firmware in the imaging device configured to receive the additional image data from the computing device such that the additional image data is communicated directly to the print engine.

20. A printing system as recited in claim 19, wherein the controller is further configured to balance the print data processing when the print data is distributed between the computing device and the imaging device.

21. A printing system as recited in claim 19, wherein the hardware-ready firmware is further configured to bypass the first print data processor in the imaging device when the additional image data is communicated directly to the print engine.

22. A printing system as recited in claim 19, wherein the controller is a component of the computing device.

23. A method, comprising:
   distributing print data processing of a print job between a computing device and an imaging device that is communicatively coupled to the computing device;
   receiving a first portion of the print data for processing with a first print data processor in the imaging device;
   generating image data for input to a print engine of the imaging device with the first print data processor;
   receiving a second portion of the print data for processing with a second print data processor in the computing device;

generating additional image data for input to the print engine of the imaging device with the second print data processor; and receiving the additional image data from the computing device with hardware-ready firmware in the imaging device such that the additional image data is communicated directly to the print engine.

24. A method as recited in claim 23, wherein distributing the print data processing includes balancing the print data processing of the print job between the computing device and the imaging device.

25. A method as recited in claim 23, wherein receiving the additional image data with the hardware-ready firmware includes bypassing the first print data processor in the imaging device when the additional image data is communicated directly to the print engine.

26. A printing system, comprising:
means for distributing print data processing of a print job between a computing device and an imaging device that is communicatively coupled to the computing device;
means for processing a first portion of the print data in the imaging device to generate image data for input to a print engine of the imaging device;
means for processing a second portion of the print data in the computing device to generate additional image data for input to the print engine of the imaging device; and
means for receiving the additional image data from the computing device in the imaging device such that the additional image data is communicated directly to the print engine.

27. A method as recited in claim 26, wherein the means for distributing the print data processing includes means for balancing the print data processing of the print job between the computing device and the imaging device.

28. A printing system as recited in claim 26, wherein the means for receiving the additional image data in the imaging device includes bypassing the means for processing the print data in the imaging device.

29. One or more computer readable media comprising computer executable instructions that, when executed, direct a printing system to:
distribute print data processing of a print job between a computing device and an imaging device that is communicatively coupled to the computing device;
process a first portion of the print data with a first print data processor in the imaging device to generate image data for input to a print engine of the imaging device;
process a second portion of the print data with a second print data processor in the computing device to generate additional image data for input to the print engine of the imaging device; and
receive the additional image data from the computing device with hardware-ready firmware in the imaging device such that the additional image data is communicated directly to the print engine.

30. One or more computer readable media as recited in claim 29, further comprising computer executable instructions that, when executed, direct the printing system to balance the print data processing when the print data is distributed between the computing device and the imaging device.

31. One or more computer readable media as recited in claim 29, further comprising computer executable instructions that, when executed, direct the printing system to bypass the first print data processor in the imaging device when the additional image data is communicated directly to the print engine.

* * * * *